(12) United States Patent
Eidelman et al.

(10) Patent No.: US 9,947,479 B2
(45) Date of Patent: Apr. 17, 2018

(54) VOLUMETRIC EFFICIENCY WET ELECTROLYTE CAPACITOR HAVING A FILL PORT AND TERMINATIONS FOR SURFACE MOUNTING

(71) Applicant: VISHAY SPRAGUE, INC., Bennington, VT (US)

(72) Inventors: Alex Eidelman, Beer-Sheva (IL); Pavel Vaisman, Omer (IL); Gabi Shilo, Beer-Sheva (IL); Evgeny Petukhov, Beer-Sheva (IL); Andrey Mitiagin, Dimona (IL)

(73) Assignee: VISHAY SPRAGUE, INC., Bennington, VT (US)

( * ) Notice: Subject to any disclaimer, the term of this patent is extended or adjusted under 35 U.S.C. 154(b) by 123 days.

(21) Appl. No.: 14/942,011

(22) Filed: Nov. 16, 2015

(65) Prior Publication Data
US 2017/0140876 A1    May 18, 2017

(51) Int. Cl.
| H01G 9/035 | (2006.01) |
| H01G 9/004 | (2006.01) |
| H01G 9/008 | (2006.01) |
| H01G 9/145 | (2006.01) |
| H01G 13/00 | (2013.01) |
| H01G 9/06  | (2006.01) |
| H01G 9/08  | (2006.01) |

(52) U.S. Cl.
CPC .............. *H01G 9/004* (2013.01); *H01G 9/008* (2013.01); *H01G 9/035* (2013.01); *H01G 9/06* (2013.01); *H01G 9/08* (2013.01); *H01G 9/145* (2013.01); *H01G 13/006* (2013.01)

(58) Field of Classification Search
CPC .......... H01G 9/042; H01G 9/15; H01G 9/045; H01G 9/145; H01G 9/28; H01G 9/08; H01G 9/10; H01G 9/035
See application file for complete search history.

(56) References Cited

U.S. PATENT DOCUMENTS

| 3,956,819 A  | 5/1976 | Augeri |
| 4,987,519 A  | 1/1991 | Hutchins et al. |
| 6,238,444 B1 | 5/2001 | Cadwallader |
| 6,380,577 B1 | 4/2002 | Cadwallader |
| 6,560,089 B2 | 5/2003 | Miltich et al. |
| 6,594,140 B1 | 7/2003 | Evans et al. |
| 6,707,660 B1 | 3/2004 | Evans et al. |
| 6,791,821 B1 | 9/2004 | Monnett |
| 6,850,405 B1 | 2/2005 | Mileham et al. |

(Continued)

*Primary Examiner* — Nguyen Ha
(74) *Attorney, Agent, or Firm* — Volpe and Koenig, P.C.

(57) ABSTRACT

A wet electrolytic surface mount capacitor has a body defining an interior area and having a fill port formed through a wall of the body. A capacitive element is positioned in an interior of the body and is isolated from the body. A surface mount anode termination is in electrical communication with the capacitive element and isolated from the body. A surface mount cathode termination is in electrical communication with the body. An electrolyte is contained in the interior area of the body, and is introduced into the interior area of the body through the fill port. A fill port plug is positioned adjacent the fill port. A fill port cover compresses the fill port plug against the fill port to seal the fill port, and may be welded in place. A method of forming the capacitor is also provided.

20 Claims, 13 Drawing Sheets

(56) References Cited

U.S. PATENT DOCUMENTS

| | | |
|---|---|---|
| 6,859,353 B2 | 2/2005 | Elliott et al. |
| 6,952,339 B1 | 10/2005 | Knowles |
| 7,274,551 B1 | 9/2007 | Parler, Jr. et al. |
| 7,983,022 B2 | 7/2011 | O'Connor et al. |
| 8,086,312 B2 | 12/2011 | Nielsen et al. |
| 8,238,079 B1 | 8/2012 | Knowles |
| 8,259,435 B2 | 9/2012 | Millman et al. |
| 8,339,769 B2 | 12/2012 | Schott et al. |
| 8,405,956 B2 | 3/2013 | Dreissig et al. |
| 8,451,586 B2 | 5/2013 | Priban |
| 8,477,479 B2 | 7/2013 | Pease et al. |
| 8,576,544 B2 | 11/2013 | Rawal et al. |
| 8,605,411 B2 | 12/2013 | Biler et al. |
| 8,687,347 B2 | 4/2014 | Bates et al. |
| 9,070,512 B2 | 6/2015 | Breithaupt et al. |
| 9,076,592 B2 | 7/2015 | Masheder et al. |
| 9,105,401 B2 | 8/2015 | Dreissig et al. |
| 2003/0088293 A1 | 5/2003 | Clarke et al. |
| 2004/0225327 A1 | 11/2004 | Norton et al. |
| 2005/0195558 A1 | 9/2005 | Goldberger et al. |
| 2006/0023400 A1* | 2/2006 | Sherwood ............ H01G 9/0032 361/503 |
| 2006/0291140 A1* | 12/2006 | Kazaryan ............... H01G 11/46 361/502 |
| 2008/0232029 A1 | 9/2008 | Ning |
| 2008/0247122 A1 | 10/2008 | Vaisman et al. |
| 2010/0175235 A1 | 7/2010 | Nielsen et al. |
| 2010/0268292 A1 | 10/2010 | Eidelman et al. |
| 2010/0297495 A1 | 11/2010 | Casby et al. |
| 2012/0087062 A1* | 4/2012 | Kurita ................... H01G 9/012 361/523 |
| 2012/0106029 A1 | 5/2012 | Galvagni et al. |
| 2012/0127632 A1 | 5/2012 | Evans et al. |
| 2012/0257327 A1 | 10/2012 | Zednickova et al. |
| 2013/0095299 A1 | 4/2013 | Evans |
| 2014/0104755 A1 | 4/2014 | Hagiwara et al. |
| 2014/0268499 A1 | 9/2014 | O'Phelan et al. |
| 2015/0127060 A1 | 5/2015 | Eidelman et al. |
| 2015/0179349 A1 | 6/2015 | Biler et al. |

* cited by examiner

VOLUMETRIC EFFICIENCY WET ELECTROLYTE CAPACITOR HAVING A FILL PORT AND TERMINATIONS FOR SURFACE MOUNTING

FIELD OF THE INVENTION

This application relates to the field of electronic components, and more specifically, capacitors and the manufacture of capacitors.

BACKGROUND

Wet capacitors are used in the design of circuits due to their volumetric efficiency, stable electrical parameters, high reliability and long service life. Such capacitors typically have a larger capacitance per unit volume than certain other types of capacitors, making them valuable in high-current, high power and low-frequency electrical circuits. One type of wet capacitor is a wet electrolytic capacitor including an anode, a cathode, and a fluid electrolyte. Wet electrolytic capacitors tend to offer a good combination of high capacitance with low leakage current. Wet electrolytic capacitors are basic to various types of electrical equipment from satellites, aerospace, airborne, military group support, oil exploration, power supplies, and the like.

Figure 1A:
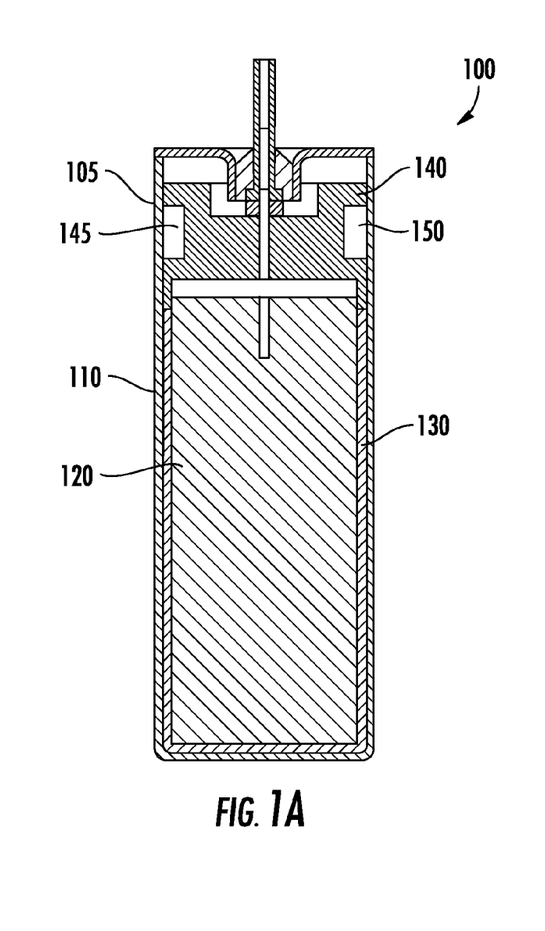
FIGS. 1A and 1B show cross-sectional views of a known capacitor, with FIG. 1B having a crimped end.
Figure 1B:
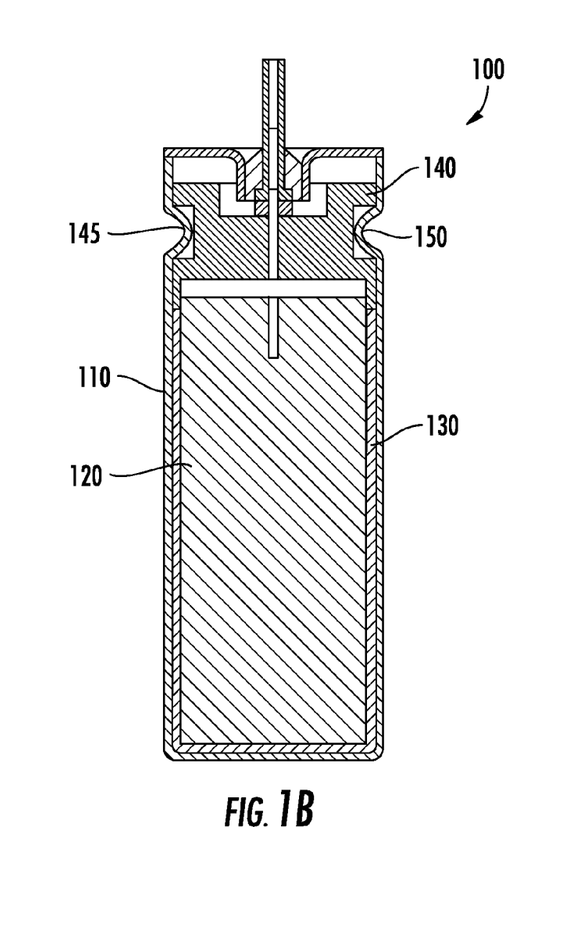
Figure 2A:
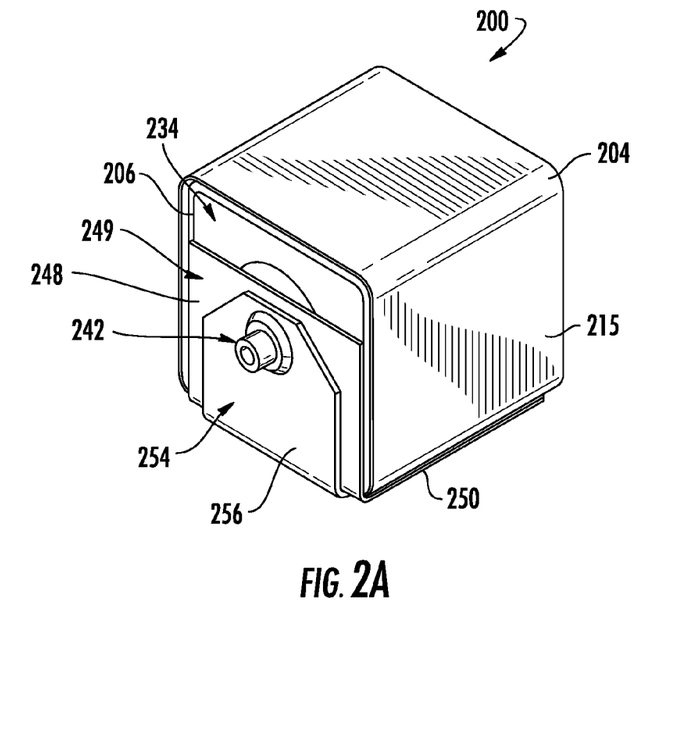
FIG. 2A is an isometric view from the anode end of a capacitor according to an embodiment of the present invention.
Figure 2B:
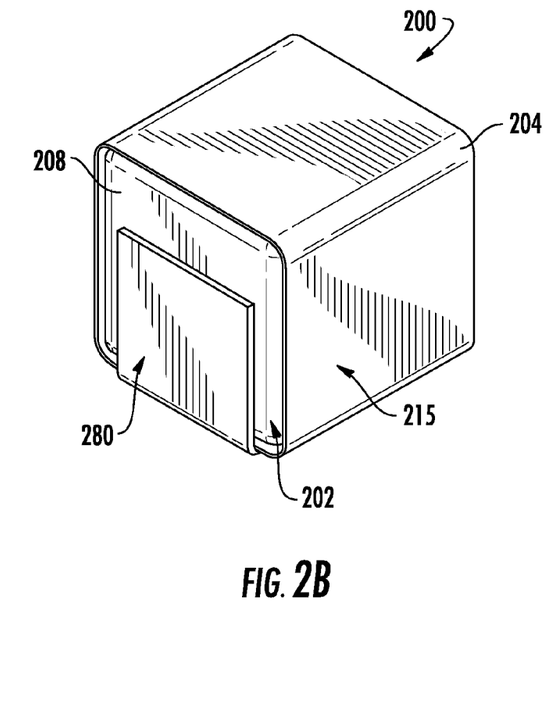
FIG. 2B is an isometric view from the cathode end of the capacitor according to an embodiment of the present invention.
Figure 3A:
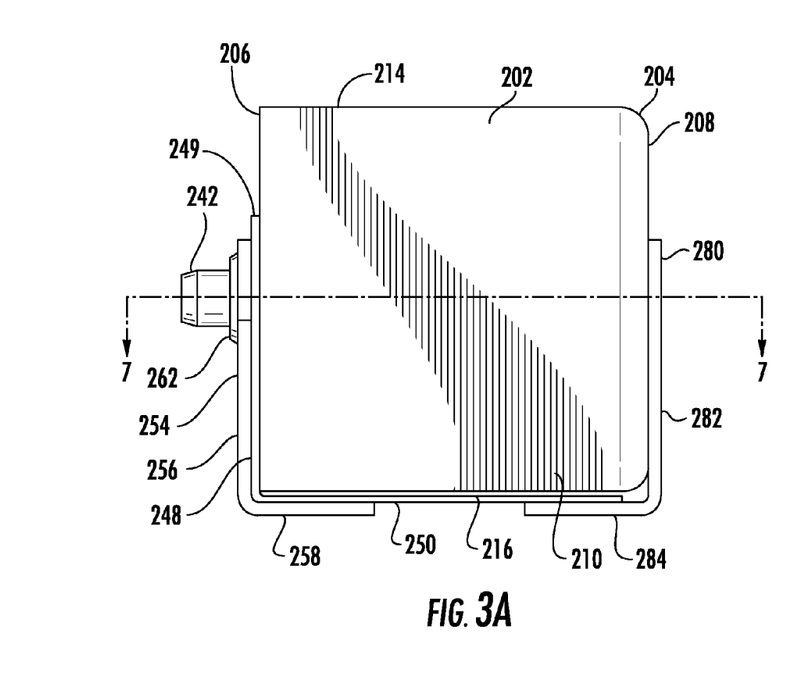
FIG. 3A is a left side view of the capacitor according to an embodiment of the present invention.
Figure 3B:
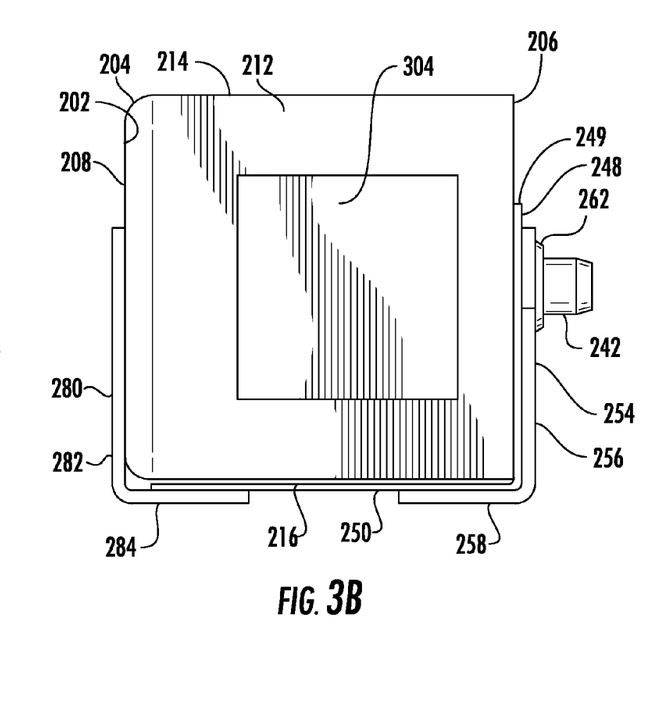
FIG. 3B is a right side view of the capacitor according to an embodiment of the present invention.
Figure 4A:
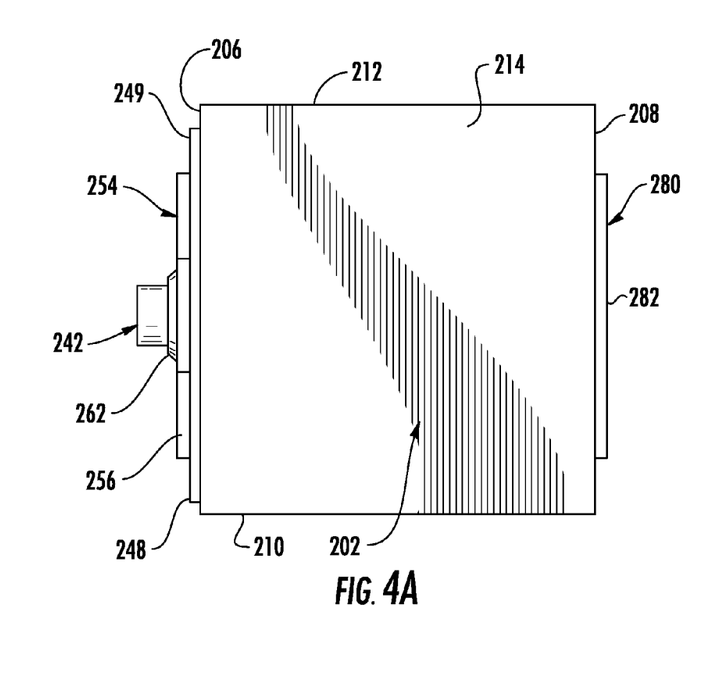
FIG. 4A is a top view of the capacitor according to an embodiment of the present invention.
Figure 4B:
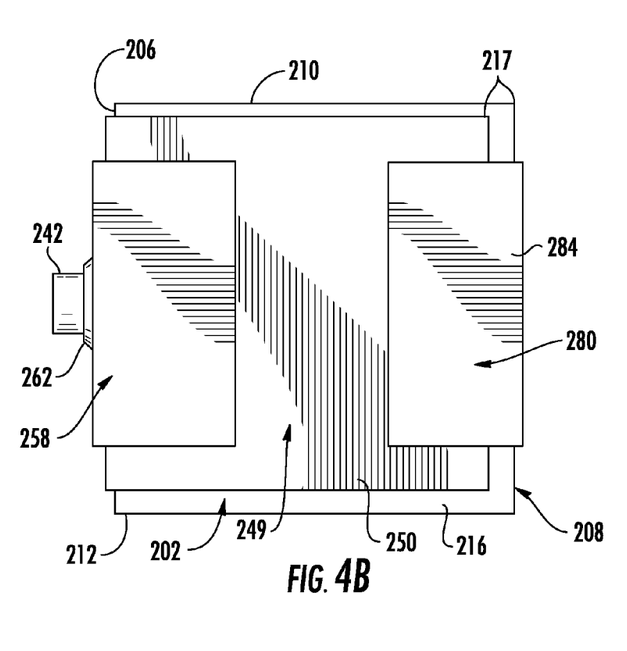
FIG. 4B is a bottom view of the capacitor according to an embodiment of the present invention.
Figure 5A:
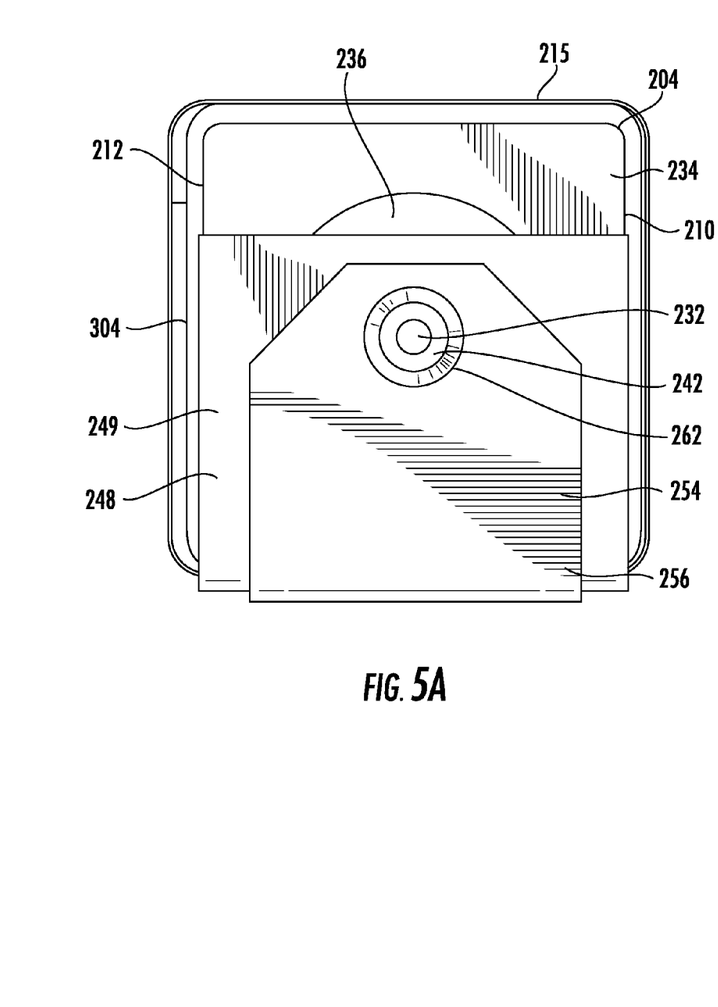
FIG. 5A is front plan view from the anode end of the capacitor according to an embodiment of the present invention.
Figure 5B:
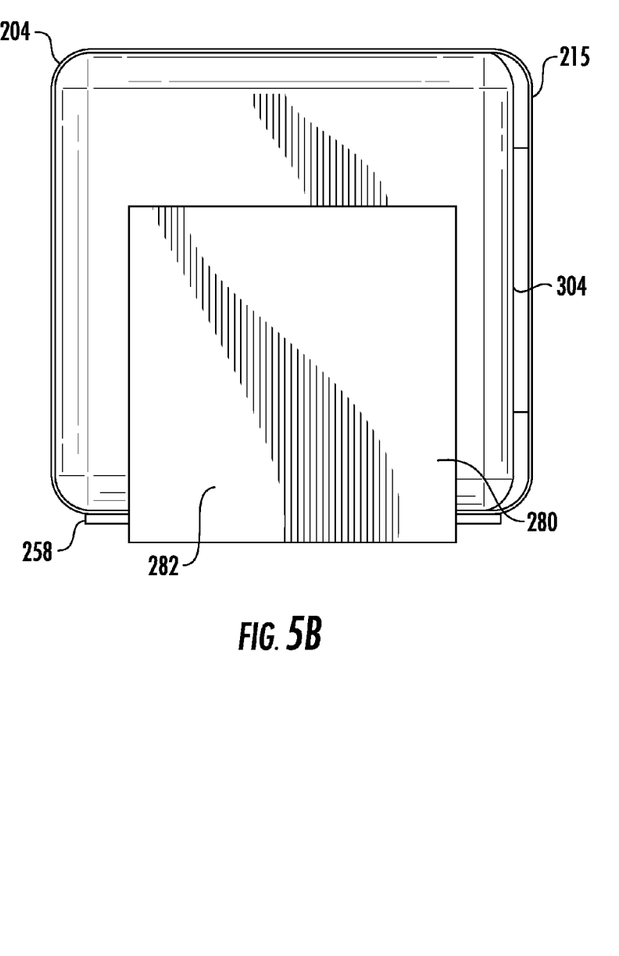
FIG. 5B is a rear plan view from the cathode end of the capacitor according to an embodiment of the present invention.

Known wet electrolytic capacitors are generally characterized as having a generally cylindrical shape and axial leaded terminations suited for Through-Hole Mounting (THM). Generally, tantalum electrolytic capacitors are known to have a general cylindrical shape and axial lead terminations suited for THM. FIGS. 1A and 1B show cross-sectional diagrams of an illustrative capacitor 100 having such an axial THM design. The capacitor 100 includes a generally cylindrical can-shaped body 105 formed from tantalum (Ta). The capacitor 100 includes an electrolyte 110 disposed in electrical contact with an anode 120 and cathode 130. The illustrated capacitor 100 includes a polytetrafluoroethylene (PTFE) bushing 140 at one end, surrounded by a rubber O-ring 150 that is positioned in a groove 145 the bushing 140. The end of the capacitor 100 is crimped 152 to compress the tantalum body 105 into the groove 145. Thus, the known axial capacitor of FIGS. 1A and 1B utilize a double seal construction consisting of a crimped PTFE plug lined with a rubber gasket serving as a primary seal, and a laser welded cover serving as a secondary seal. As can be appreciated, in such known capacitors, the PTFE bushing is located inside the interior area of the capacitor body or "can," and thus takes up space from a limited volume that could otherwise be used for placement of a capacitive element.

THM assembly technology was standard practice for capacitors until the late 1980s, when Surface-Mount Technology (SMT), resulting in Surface Mount Devices (SMDs), largely replaced THM for a variety of cost and efficiency reasons. For example, THM requires the drilling of holes in the printed circuit board (PCB), which is expensive and time consuming. Component assembly speed for SMT is generally faster than that of THM because THM requires soldering on both sides of the board, as opposed to surface-mounts, which typically require attention to only one side of the PCB. THM assembly generally uses wave, selective, or hand-soldering techniques, which are much less reliable and repeatable than reflow ovens used for surface mounting. Furthermore, SMT components are generally smaller than its THM counterparts because they have either smaller leads or no leads at all.

One way to improve volumetric efficiency is to use a high performing material, for example, tantalum (Ta), Niobium (Nb), or Niobium Oxide (NbO), for the anode material. Certain solid core or pellet surface mount capacitors of this general type are known in the art. Examples can be seen at U.S. Pat. Nos. 6,380,577, 6,238,444, and 7,161,797, which are incorporated by reference herein. In those patents, examples show a solid interior core (sometimes called an anode body, slug or pellet) is primarily Ta. The tantalum anode body is usually sintered. A wire is commonly formed in the anode body in one of two ways: (a) "embedded" meaning the wire (which also can be tantalum) is covered with tantalum powder during a pressing process; or (b) "welded" meaning after the pellet is pressed and sintered, the wire is welded to the Ta slug. The other end extends outside the slug. The capacitor dielectric material is made by anodic oxidation of the anode material to form an oxide layer over the surface of the anode body (e.g., Ta to $Ta_2O_5$). If the anode body is Nb the oxidation is Nb to $Nb_2O_5$; if NbO, the oxidation is NbO to $Nb_2O_5$. A capacitor cathode is commonly formed by coating the dielectric layer with a solid electrolyte layer (e.g., of $MnO_2$) and a conductive polymer, and later covered with graphite and silver for better conductivity and improved mechanical strength. Anode and cathode terminations can be connected to the free end of the Ta wire and the outer electrolyte surface coating of the Ta pellet, respectively, and all these components can then be encapsulated within a case (e.g., by molding plastic around the components), leaving only outer surface(s) of the anode and cathode terminations exposed on the exterior of the case for, e.g., surface mounting.

As can be appreciated, such known capacitors do not utilize a tantalum case or "can," or a "wet" (fluid) electrolyte. Thus, they do not address the issue of volumetric efficiency when introducing a fluid electrolyte into a preformed tantalum case or can. They also do not address how to effectively seal such a case when the fluid electrolyte has been introduced.

There remains a need, then, for an improved wet electrolytic capacitor having a tantalum case, and in particular, for an improved wet electrolytic capacitor suitable for surface mounting and having improved volumetric efficiency. Further, there is a need for a capacitor having an improved construction for introducing an electrolyte into the interior of the capacitor body, without taking up valuable space in or on the capacitor body.

SUMMARY

In one aspect of the present invention, a wet electrolytic surface mount capacitor is provided having a case with a fill port located through a wall of the body of the capacitor. A fluid electrolyte is introduced into the interior of the body through the fill port. The fill port is sealed by a compressible fill port plug and a fill port cover.

The present invention is also directed to, in another aspect, a wet electrolytic surface mount capacitor including a body defining an interior area and having a fill port formed through a wall of the body. The body has a cathode end and an opposite anode end, and is preferably tantalum. A capacitive element is positioned in an interior of the body and isolated from the body. A surface mount anode termination is provided in electrical communication with the capacitive element and isolated from the body. A surface mount cathode termination is provided in electrical communication with the body. An electrolyte is contained in the interior area of the body, and is introduced into the interior area of the body through the fill port. A fill port plug is positioned adjacent the fill port. A fill port cover is positioned on the body to compress the fill port plug against the fill port to seal the fill port. The fill port cover may be welded to the body.

A method of forming a cathode is also provided. A method of making a wet electrolytic surface mount capacitor, may preferably comprise the steps of: forming a body defining an interior area, the body having an open anode end and an opposite closed cathode end; forming a fill port through a wall of the body; placing a capacitive element in the interior area of the body and isolating the capacitive element from the body; placing a cover over the anode end; introducing an electrolyte into the interior area of the body through the fill port; positioning a fill port plug adjacent the fill port; attaching the fill port cover to an outer surface of the body over the fill port plug to compress the fill port plug against the fill port to seal the fill port; forming a surface mount anode termination on an outer surface of the capacitor in electrical communication with the capacitive element and isolated from the body; and forming a surface mount cathode termination on an outer surface of the capacitor in electrical communication with the body.

BRIEF DESCRIPTION OF THE DRAWINGS

A more detailed understanding may be had from the following description, given by way of example in conjunction with the accompanying drawings wherein.

DETAILED DESCRIPTION

Certain terminology is used in the following description for convenience only and is not limiting. The words "right," "left," "top," and "bottom" designate directions in the drawings to which reference is made. The words "a" and "one," as used in the claims and in the corresponding portions of the specification, are defined as including one or more of the referenced item unless specifically stated otherwise. This terminology includes the words above specifically mentioned, derivatives thereof, and words of similar import. The phrase "at least one" followed by a list of two or more items, such as "A, B, or C," means any individual one of A, B or C, as well as any combination thereof.

FIGS. 2-10 show a capacitor 200 according to an embodiment of the invention. The capacitor 200 includes a capacitor body 202. The capacitor body 202 is essentially formed as a tantalum case or "can" having at least one open end, and defining an interior area 203. The body 202 has an open anode end 206 and an opposite closed cathode end 208. Referring to the orientation of capacitor 200 as depicted in the Figures for illustrative purposes, the body 202 further has a left side 210, a right side 212, a top 214, and a bottom 216. While the shape of the body 202 may vary, in an embodiment of the invention and as shown in the Figures, the side and top and bottom walls of the body 202 may have a generally rectangular shape, and may have rounded or beveled edges at the corners 204. The capacitor 200 may further have an overall rectangular shape. The shape and construction of the body 202 assists in providing for improved volumetric efficiency over a cylindrical capacitor of the same length, width and height.

Figure 7:
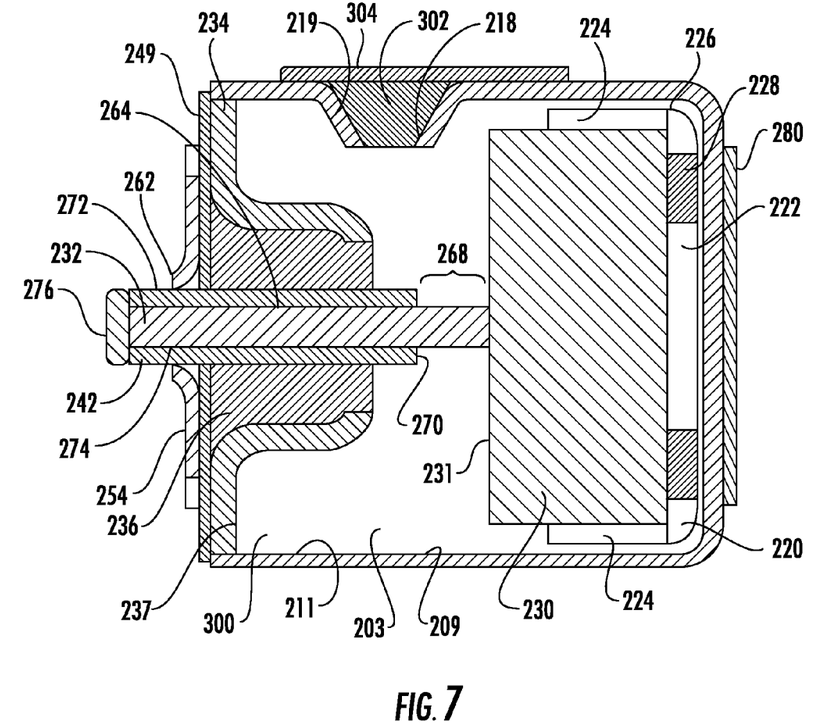
FIG. 7 is a cross-sectional view from the top of the capacitor taken along line 7-7 of FIG. 3A.
Figure 8:
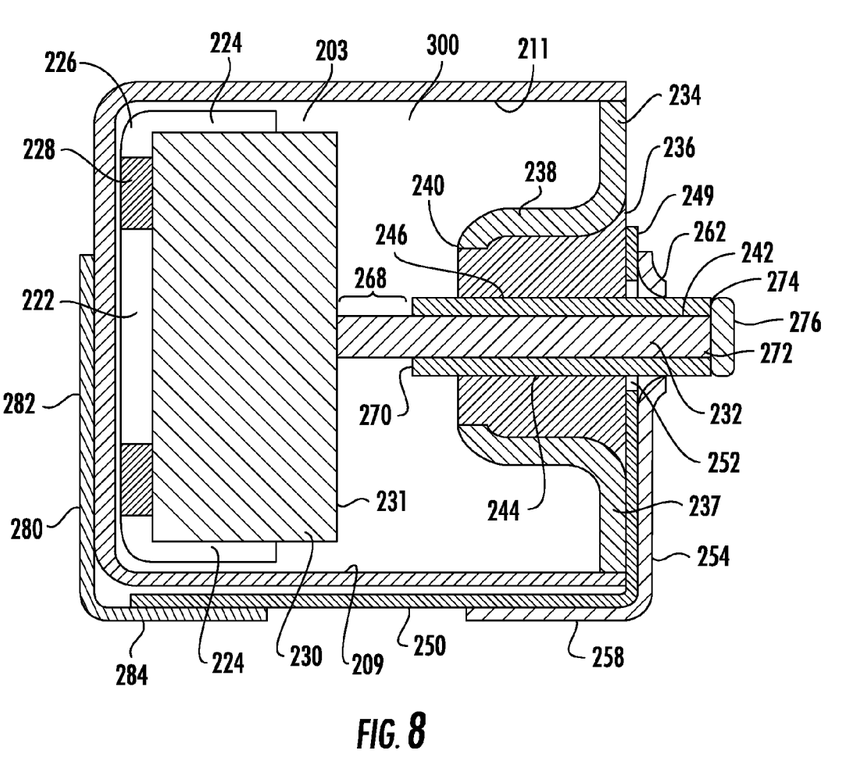
FIG. 8 is a cross-sectional view from the top of the capacitor showing an embodiment of the invention taken along line 8-8 of FIG. 6A.
Figure 9:
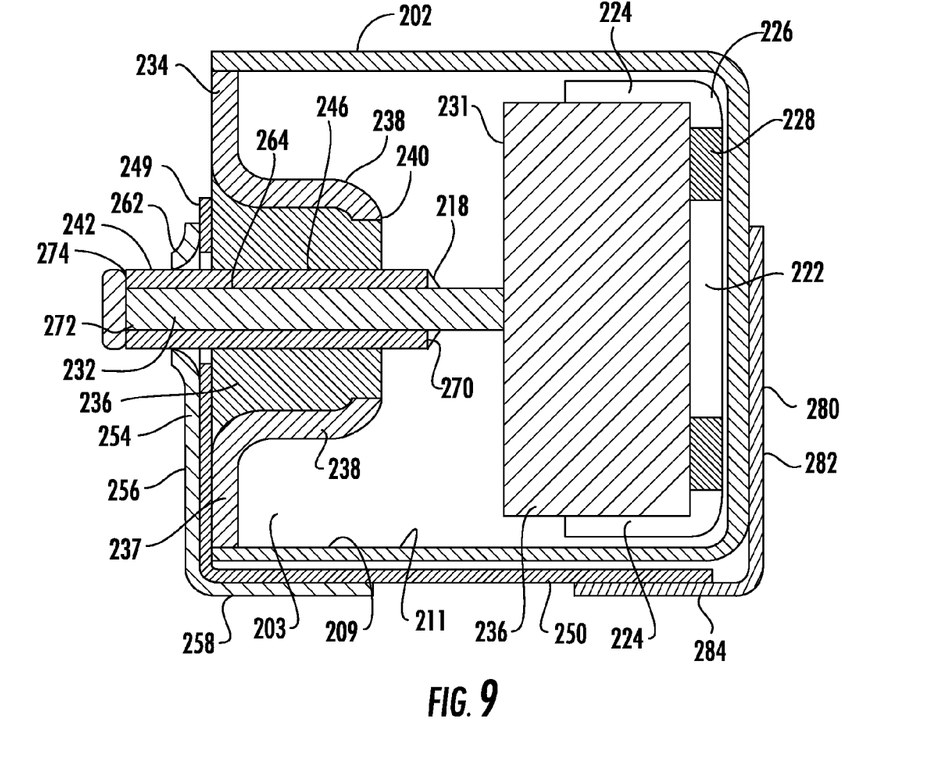
FIG. 9 is a cross-sectional view from the top of the capacitor showing an embodiment of the invention taken along line 9-9 of FIG. 6B.
Figure 10:
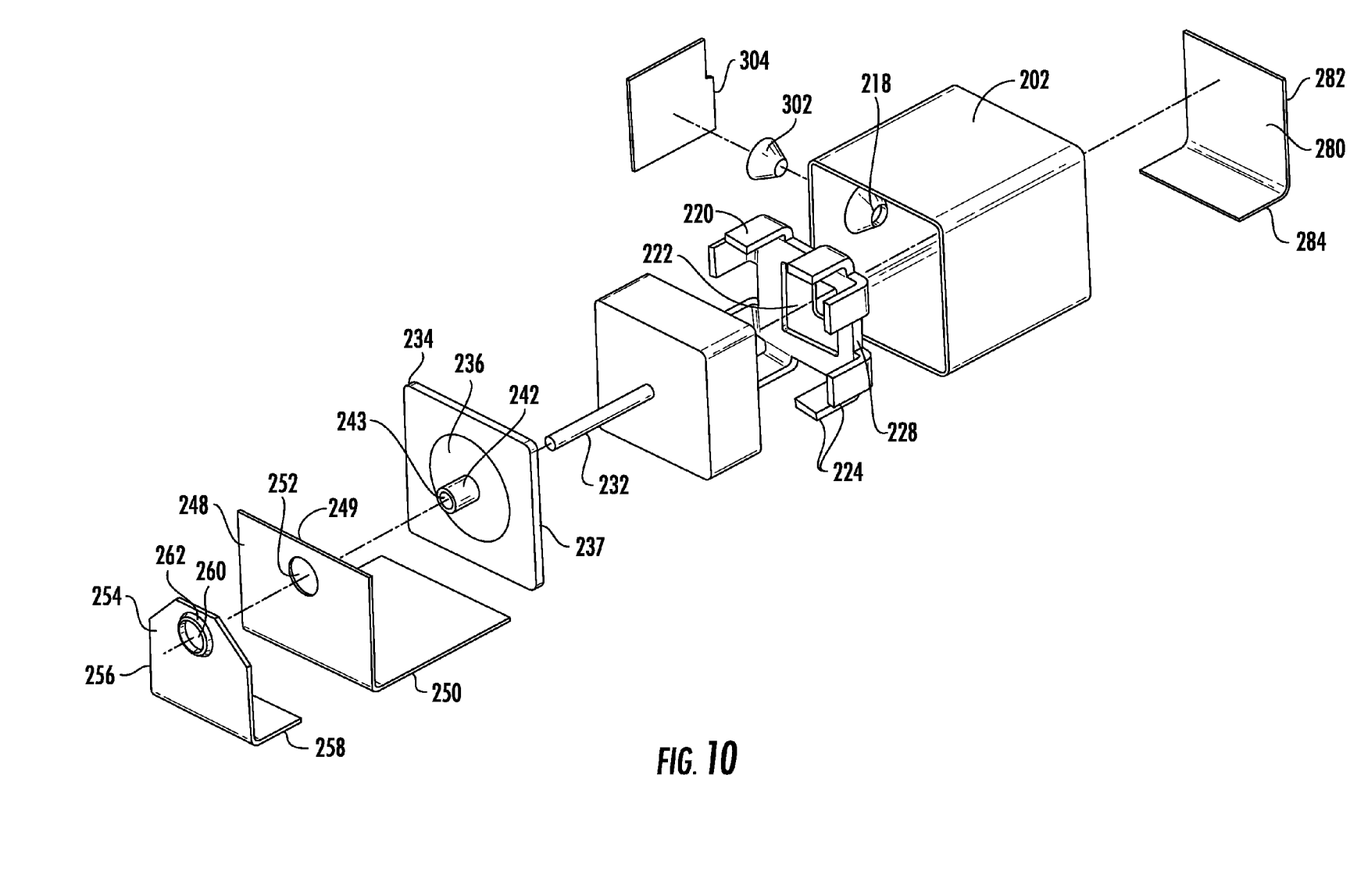
FIG. 10 is an exploded view of a capacitor according to an embodiment of the invention.

As shown in FIGS. 7-9, the inner surface 209 of at least a portion of the tantalum body 202 comprises a cathode layer 211, and may comprise, for example, sintered tantalum. The cathode layer 211 may also be an electrophoretically deposited tantalum, as described in U.S. Pat. No. 9,070,512, the entire contents of which is incorporated by reference herein.

As shown in FIGS. 2A, 2B, 5A, and 5B, the body 202 may be wrapped in an outer insulative wrapping 215 around the left side, right side, and top and bottom walls, covering the body 202. The insulative wrapping 215 may preferably be formed from a polyimide based material.

As shown in FIGS. 7 and 8, one side of the body 202, and in the illustrated examples, the right side 212 of the body 202, includes a wall 219 defining a preferably funnel-shaped fill port 218, providing an opening through which a fluid electrolyte can be introduced into the body 202. The fill port 218 may be formed by punching a funnel-shaped opening in the body 202 during construction of the body 202. As discussed in greater detail below, this fill port 218 will be used for introducing an electrolyte into the interior area 203 of the body 202. The fill port 218 may alternately be formed in another position along the body 202 without departing from the scope of the present invention.

As shown in FIGS. 7-10, an insulative insert 220 is provided within the interior area 203 of the capacitor 200 adjacent the cathode end 208. The insulative insert 220 includes a generally rectangular wall 228, having a central opening 222 and having flanges 224 extending toward the anode end 206 preferably at each corner 226 of the wall 228. The insulative insert 220 is configured to receive, grip and hold a capacitive element 230 such as a tantalum slug or pellet, and to electrically and physically isolate the capacitive element 230 from the body. The insulative insert 220 may be formed from any acceptable insulative material for use in forming a capacitor, and preferably comprises an acid resistant material such as PTFE, polyvinyl chloride (PVC), polyether ether ketone (PEEK), or other materials having similar properties as would be known to those of skill in the art. The insulative insert 220 is preferably non-conductive.

As shown in FIGS. 7-10, a capacitive element 230 is provided in the interior area 203, and is shaped and sized so as to be positioned and held within the area defined by the flanges 224 of the insulative insert 220, and gripped by the flanges 224 such as by a friction fit. The capacitive element 230 (which may sometimes be referred to in the art as an "anode body," "slug," or "pellet") may preferably be formed as a tantalum slug or solid pellet anode body, or may comprise other materials as appreciated by a person of skill in the art, such as Nb or NbO.

As shown in FIGS. 7-10, an anode wire 232 is provided extending from a front surface 231 of the capacitive element 230, and extending in the direction of the anode end 206. The anode wire 232 comprises a portion of the anode of the capacitor 200, and is in electrical communication with the capacitive element 230. The anode wire 232 may be formed as a wire providing electrical communication between the capacitive element 230 and an anode termination 254, described in further detail below. The anode wire 232 may be imbedded in, welded to, or otherwise connected, joined, or bonded to, the capacitive element.

As stated, the capacitive element comprises a solid pellet anode body 230, with an embedded or welded wire in the anode body. A dielectric layer is formed by oxidation of the anode body and an electrolyte layer forms over the dielectric layer.

Considering the capacitor 200 from the anode end 206, a glass-to-metal seal (GTMS) cover 234 is positioned adjacent the anode end 206 within the walls of the body 202 of the capacitor 200, and is welded in place to effectively seal the originally open anode end 206. The cover 234 includes a conductive metal outer portion 237 formed from tantalum, and a non-conductive central insert portion 236 formed from glass and including an anode tube 242. As shown in FIGS. 7-10, the outer portion 237 has a generally annular wall 238 extending into the interior area 203 of the body 202, forming an opening 244. The annular wall 238 terminates in a generally flat circular inwardly facing surface 240. The central insert portion 236 has a general bell-shape and is positioned within the opening 244 and has a channel 246 formed through its central portion. The anode tube 242 is positioned within the channel 246 and extends axially through the channel. The anode tube 242 includes a hollow channel 243 therethrough, and is preferably formed from tantalum.

The GTMS cover 234 is placed at the anode end opening of the tantalum case 202, while the anode wire 232 is inserted into the anode tube 242. The anode tube 242 is electrically isolated from the tantalum outer portion 237 by a glass bead forming the insert portion 236 that is inserted into the GTMS (glass-to-metal-seal) structure. During manufacture, the GTMS cover 234 is welded to the case 202 while the anode wire 232 is welded to the anode tube 242 within the GTMS central insert portion 236 creating the anode of the capacitor. Accordingly, the GTMS cover 234 comprises several components that are essentially fused together to form a single cover 234 unit: the tantalum (metal) outer portion 237, glass (non-conductive) central insert portion 236, and the tantalum anode tube 242.

As shown, for example, in FIGS. 2A, 3A, 3B, 5A, 6A, 6B, and 10, an isolative shim 249 includes a first wall portion 248 and a second wall portion 250 that is bent generally perpendicularly to the first wall portion 248. The first wall portion 248 includes an opening 252 aligned with the opening 244 of the cover 234. The first wall portion 248 is positioned vertically in the orientation of the Figures, and adjacent the cover 234. The second wall portion 250 is positioned horizontally in the orientation of the Figures, and is positioned along the bottom 216 of the body 202, and extends from the anode end 206 and along the length of bottom 216 toward the cathode end. The isolative shim 249 is essentially L-shaped. A space 217 may be provided between the end of the second wall portion 250 and the cathode end 208 of the body 202. The isolative shim 249 is preferably formed from a material comprising PTFE. However, it is appreciated that the isolative shim 249 may comprise any non-conductive flexible material that can withstand reflow temperatures of about 260 degrees Celsius and below. The primary purpose of the isolative shim 249 is to isolate the anode termination from the tantalum body 202, which itself comprises a part of the cathode of the capacitor.

An anode termination 254 includes a first wall portion 256 and a second wall portion 258 that is bent generally perpendicularly to the first wall portion 256. The first wall portion 256 is positioned vertically in the orientation of the Figures, and includes an opening 260 aligned with opening 244 and opening 252. The first wall portion 256 may have inwardly angled edges adjacent its top corners, as shown in FIGS. 2A, 5A, 6A, and 6B. The anode termination 254 is essentially L-shaped. A raised circular lip 262 is provided about the opening 260. The first wall portion 256 is positioned adjacent the isolative shim 249. The second wall portion 258 is positioned horizontally in the orientation of the Figures, and is positioned along the bottom of the second wall portion 250.

Figure 6A:
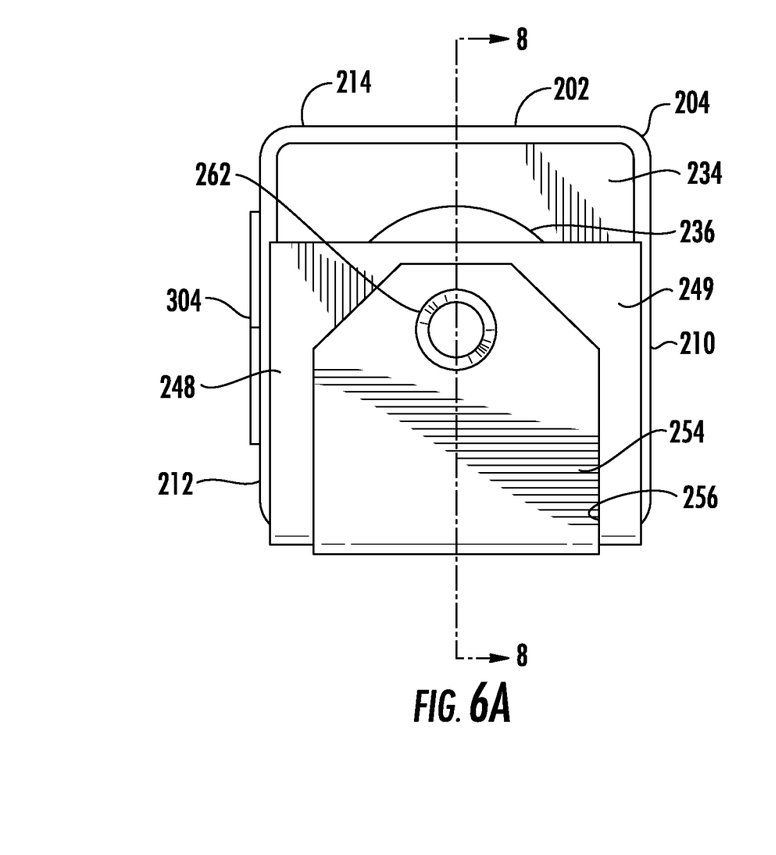
FIG. 6A is a front plan view from the anode end of the capacitor according to an embodiment of the present invention showing cross-sectional line for FIG. 8.
Figure 6B:
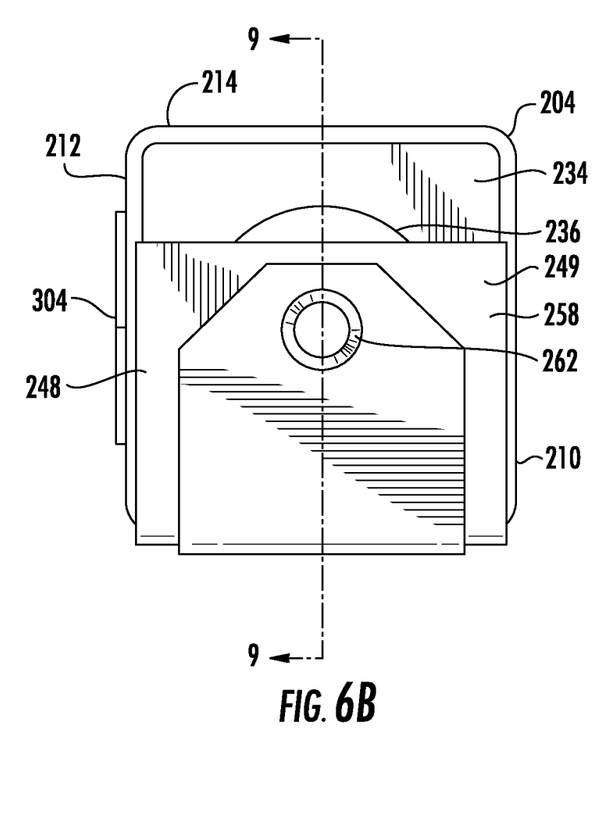
FIG. 6B is a front plan view from the anode end of the capacitor according to an embodiment of the present invention showing cross-sectional line for FIG. 9.

As shown in FIGS. 6 and 7, opening 244, opening 252, and opening 260 form a channel 264 through which a GTMS anode tube 242 extends. The anode tube 242 extends through the channel 264 and into the interior area 203 of the body 202. The anode tube 242 preferably has a length whereby it does not reach the front surface 231 of the capacitive element 230 facing the anode end 206, and leaves a space or gap 268 between the interior end 270 of the anode tube 242 and the surface 231 of the capacitive element 230. The anode wire 232 extends through the anode tube 242. The outer end 272 of the anode wire 232 is welded to the outer end 274 of the anode tube 242. Molten metal from the welding process may form a rounded end 276 or bead at the end of the anode tube 242.

A cathode termination 280 includes a first wall portion 282 and a second wall portion 284 that is bent generally perpendicularly to the first wall portion 282. The first wall portion 282 is positioned vertically in the orientation of the Figures, and is positioned adjacent the cathode end 208 of the body 202. The cathode termination 280 is essentially L-shaped. The second wall portion 284 is positioned horizontally in the orientation of the Figures, and is positioned along the bottom 216 of the body 202, and adjacent the cathode end 208.

A fluid electrolyte 300 is introduced into the interior area 203 of the capacitor 200 through the fill port 218. A fill port plug 302 is used to close the fill port 218, and is positioned adjacent the fill port 218 along an outer surface of the body 202. The fill port plug 302 preferably comprises a compressible material such as rubber, for example a synthetic rubber, and/or a fluoropolymer elastomer or plastic. The fill port plug 302 is compressible, and may be a, oblong, spherical, or funnel-shaped plug so as to fit in a complimentary manner within the funnel-shaped fill port 218. A fill port cover 304, which preferably comprises tantalum, is provided over the fill port plug 302, and compresses the fill port plug 302 into the fill port 218, thus effectively sealing the fill port 218 and thus the body of the capacitor. The fill port cover 304 may preferably be welded to the body 202. The electrolyte 300 fills the space of the interior area 203 between the capacitive element 230 and the cathode layer 211 and body 202, and provides for electrical communication between those.

Figure 11:
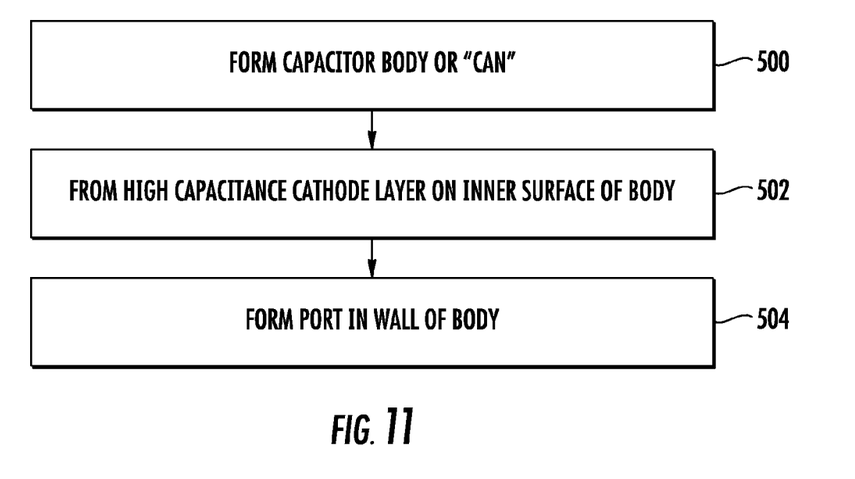
FIG. 11 is a flow diagram of a process for making the case of a capacitor according to an embodiment of the invention.
Figure 12:
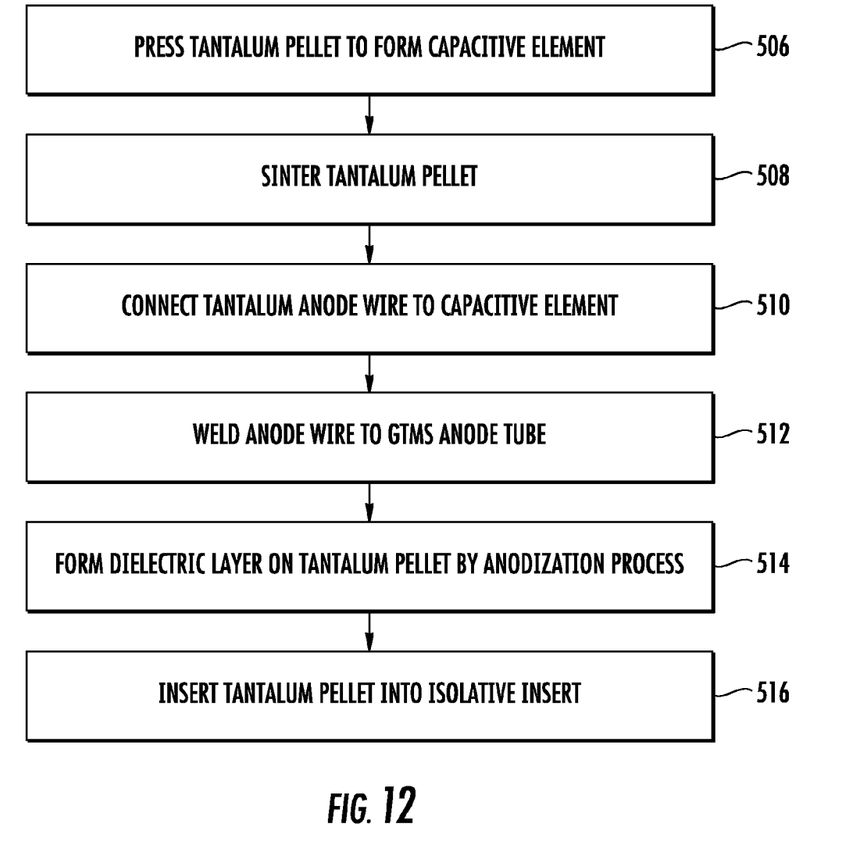
FIG. 12 is a flow diagram of a process for preparing an anode in the manufacture of a capacitor according to an embodiment of the invention.
Figure 13:
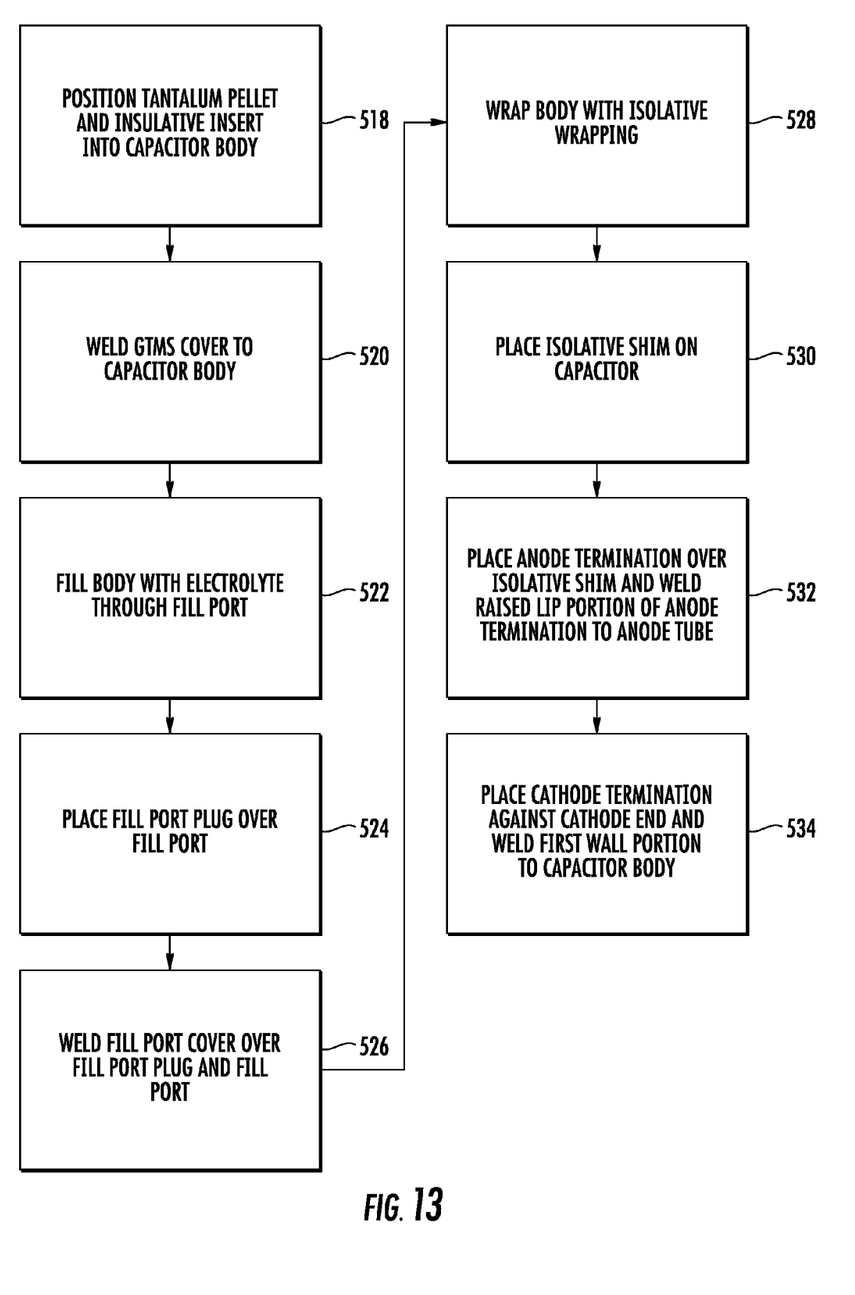
FIG. 13 is a flow diagram of a process for assembling a capacitor according to an embodiment of the invention.

As shown schematically as flow diagrams in FIGS. 11-13, a method of manufacturing a capacitor according to the invention is also provided.

As illustrated in FIG. 11, first, the body 202 or "can" is prepared to form the cathode. A tantalum capacitor body 202 is formed [500], having an opening at one end. A high capacitance cathode layer 211 is applied to the inner surface 209 of the tantalum capacitor body 202 [502]. A funnel-shaped fill port 218 is formed in a wall of the body 202 [504].

As illustrated in FIG. 12, the anode of the capacitor is also prepared. First, a tantalum pellet is pressed to form the capacitive element 230 [506]. The tantalum pellet is then sintered [508]. The tantalum anode wire 232 is connected to the capacitive element 230 [510]. The anode wire is welded to the GTMS anode tube 232 [512]. A dielectric layer is formed on the capacitive element 230 by an anodization process [514], whereby anodic oxidation of the anode material forms an oxide layer over the surface of the anode. The capacitive element 230 is then inserted into the isolative insert 220 [516].

The capacitor assembly is illustrated in FIG. 13. The insulative insert 220 and capacitive element 230 are positioned inside the interior area 203 of the body 202 adjacent the cathode end 208 [518]. The GTMS cover 234 is placed over the open anode end 206 of the body 202 and is welded in place [520]. The body 202 is filled with a fluid electrolyte 300 that is introduced into the interior area 203 through the funnel-shaped fill port 218 [522]. A fill port plug 302 is placed against the fill port 218 [524]. A fill port cover 304 is placed over the plug 302 and the fill port 218, compressing the plug 302 into the fill port 218, and the fill port cover 304 is welded in place to the body [526].

An insulative wrapping 215 is provided to cover the body 202 [528].

An isolative shim 249 is placed over the cover 234 [530], with the openings in the isolative shim 249 and the anode tube 242 aligned. An anode termination 254 is placed over the isolative shim 249 and the raised lip portion 262 of the anode termination is welded to the anode tube 242 [532].

A cathode termination 280 is placed over the cathode end 208 of the body 202 [534], and the first wall portion 282 of the cathode termination 280 is welded to the capacitor body 202 adjacent the cathode end 208.

It is appreciated that the steps shown in FIGS. 11-13 and described above are for illustrative purposes only. These steps may be varied in any desirable or suitable order as will be appreciated by those of skill in the art. In addition, one or more of the steps may be combined into a single manufacturing step, or steps may be skipped or omitted, depending on the preference of the manufacturer.

As described herein, a wet electrolytic surface mount capacitor is provided having an increased volumetric efficiency, by virtue of, inter alia, providing a fill port through a wall of a capacitor body in order to introduce the fluid electrolyte into the interior area of the capacitor body. The single fill port-plug-cover arrangement of the invention saves critical space for various components of the capacitor, and provides more flexibility in positioning, sizing and arranging various components of the capacitor. In addition, the anode terminal and the cathode termination form surface mount terminations for mounting the capacitor to, for example, a printed circuit board.

Although the features and elements of the present invention are described in the example embodiments in particular combinations, each feature may be used alone without the other features and elements of the example embodiments or in various combinations with or without other features and elements of the present invention.

What is claimed is:

1. A wet electrolytic surface mount capacitor, comprising:
a body defining an interior area and comprising a fill port formed through a wall of the body, the body having a cathode end and an opposite anode end, the anode end of the body being open;
a cover adjacent the anode end of the body positioned to close a portion of the open anode end;
a compressible fill port plug positioned adjacent the fill port;
a fill port cover positioned adjacent the fill port plug and configured to compress the fill port plug against the fill port to seal the fill port;
a capacitive element positioned in the interior of the body and isolated from the body, the capacitive element comprising an anode wire extending from a surface of the capacitive element toward the anode end of the body and accessible externally from the body;
a surface mount anode termination in electrical communication with the capacitive element and isolated from the body;
a surface mount cathode termination in electrical communication with the body; and
a fluid electrolyte contained in the interior area of the body.

2. The wet electrolytic surface mount capacitor of claim 1, further comprising an insulative insert positioned within the interior area of the body adjacent the cathode end of the body, the insulative insert shaped to engage the capacitive element and configured to isolate the capacitive element from the body.

3. The wet electrolytic surface mount capacitor of claim 1, wherein the cover comprises a glass-to-metal-seal (GTMS) cover.

4. The wet electrolytic surface mount capacitor of claim 3, wherein the GTMS cover comprises an outer conductive portion, a non-conductive central insert portion, and an anode tube extended axially through the central portion, the anode wire positioned within the anode tube.

5. The wet electrolytic surface mount capacitor of claim 4, further comprising an isolative shim positioned between the anode termination and the cover, wherein the anode tube extends through a channel formed through the anode termination and isolative shim.

6. The wet electrolytic surface mount capacitor of claim 1, wherein the body has a generally rectangular shape.

7. The wet electrolytic surface mount capacitor of claim 1, wherein the fill port plug comprises a synthetic rubber or a fluoropolymer elastomer or a combination thereof.

8. The wet electrolytic surface mount capacitor of claim 1, wherein the surface mount anode termination and the surface mount cathode termination each have a portion on a bottom side of the capacitor body.

9. The wet electrolytic surface mount capacitor of claim 1, further comprising an insulative wrapping covering at least a portion of the body.

10. The wet electrolytic surface mount capacitor of claim 1, wherein the fill port is positioned on a portion of the body other than at the anode end or the cathode end.

11. The wet electrolytic surface mount capacitor of claim 10, wherein the fill port is positioned on a different side of the body than any portion of the surface mount anode termination or the surface mount cathode termination.

12. The wet electrolytic surface mount capacitor of claim 1, wherein the body comprises tantalum.

13. A method of making a wet electrolytic surface mount capacitor, comprising the steps of:
    forming a body defining an interior area, the body having an open anode end and an opposite closed cathode end;
    forming a fill port through a wall of the body;
    placing a capacitive element in the interior area of the body and isolating the capacitive element from the body;
    placing a cover over the anode end, the cover over the anode end comprising a glass-to-metal-seal cover including an outer conductive portion, a non-conductive central insert portion, and an anode tube extended axially through the central portion;
    welding the cover adjacent the anode end of the body to close the body;
    introducing an electrolyte into the interior area of the body through the fill port;
    positioning a fill port plug adjacent the fill port;
    attaching the fill port cover to an outer surface of the body over the fill port plug to compress the fill port plug against the fill port to seal the fill port;
    forming a surface mount anode termination on an outer surface of the capacitor in electrical communication with the capacitive element and isolated from the body; and
    forming a surface mount cathode termination on an outer surface of the capacitor in electrical communication with the body.

14. The method of claim 13, wherein the capacitive element further comprises an anode wire extending from a surface thereof, and further comprising positioning the anode wire through the anode tube and in electrical communication with the surface mount anode termination.

15. The method of claim 14, further comprising welding at least a portion of the anode wire to at least a portion of the anode tube.

16. The method of claim 15, further comprising welding at least a portion of the anode tube to at least a portion of the anode termination.

17. A wet electrolytic surface mount capacitor, comprising:
    a body defining an interior area and comprising a fill port formed through a wall of the body, the body having a cathode end and an opposite anode end;
    a compressible fill port plug positioned adjacent the fill port;
    a fill port cover welded to the body and covering the fill port plug and configured to compress the fill port plug against the fill port to seal the fill port;
    a capacitive element positioned in the interior of the body and isolated from the body;
    a surface mount anode termination in electrical communication with the capacitive element and isolated from the body;
    a surface mount cathode termination in electrical communication with the body; and
    a fluid electrolyte contained in the interior area of the body.

18. The wet electrolytic surface mount capacitor of claim 17, wherein the capacitive element further comprises an anode wire extending from a surface of the capacitive element toward the anode end of the body and accessible externally from the body.

19. The wet electrolytic surface mount capacitor of claim 18, wherein the anode end is open, and further comprising a cover adjacent the anode end of the body positioned to close the open anode end.

20. The wet electrolytic surface mount capacitor of claim 17, wherein the surface mount anode termination and the surface mount cathode termination each have a portion on a bottom side of the capacitor body.

* * * * *